(12) United States Patent
Davies (10) Patent No.: US 10,222,087 B2
(45) Date of Patent: Mar. 5, 2019

(54) SYSTEM AND METHOD OF COOLING BY LATENT ENERGY TRANSFER

(71) Applicant: INTEX HOLDINGS PTY LTD, Payneham, South Australia (AU)

(72) Inventor: Roger Philip Davies, Collinswood (AU)

(73) Assignee: Intex Holdings Pty Ltd, Payneham, South Australia (AU)

(*) Notice: Subject to any disclaimer, the term of this patent is extended or adjusted under 35 U.S.C. 154(b) by 0 days.

(21) Appl. No.: 15/522,193

(22) PCT Filed: Oct. 27, 2015

(86) PCT No.: PCT/AU2015/000642
§ 371 (c)(1),
(2) Date: Apr. 26, 2017

(87) PCT Pub. No.: WO2016/065395
PCT Pub. Date: May 6, 2016

(65) Prior Publication Data
US 2017/0314806 A1  Nov. 2, 2017

(30) Foreign Application Priority Data
Oct. 27, 2014 (AU) ................. 2014904294

(51) Int. Cl.
*F24F 12/00* (2006.01)
*F24F 3/14* (2006.01)
(Continued)

(52) U.S. Cl.
CPC .............. *F24F 12/002* (2013.01); *F24F 3/14* (2013.01); *F24F 5/0007* (2013.01);
(Continued)

(58) Field of Classification Search
CPC .......... F24F 12/002; F24F 3/14; F24F 5/0035; F24F 3/1417; F25B 25/005; F25B 11/02; F25B 1/00; F25B 39/04; Y02A 30/277
See application file for complete search history.

(56) References Cited

U.S. PATENT DOCUMENTS 1,903,301 A   4/1933   Snowden et al.
1,933,703 A   11/1933  Brus et al.
(Continued)

FOREIGN PATENT DOCUMENTS

AU   5449573 A   11/1974

*Primary Examiner* — Emmanuel Duke
(74) *Attorney, Agent, or Firm* — Sand, Sebolt & Wernow LPA (57) ABSTRACT

The present invention relates to a system and method of cooling by latent energy transfer and, in particular, to cool a fluid by discharging unwanted low temperature thermal energy to a surrounding ambient environment utilizing a fluid evaporation process involving permitted or forced ventilation of air across a surface area of a heat transfer fluid. The invention further relates to an air treatment system utilizing the cooled heat transfer fluid for cooling air and for supplying ventilation air to the evaporation process. A body of liquid is cooled close to the prevailing wet bulb temperature, discharging unwanted thermal energy to the surroundings, rendering the liquid suitable as a cooling medium for removing unwanted thermal energy from a location or in a process.

18 Claims, 7 Drawing Sheets

(51) Int. Cl.
*F24F 6/02* (2006.01)
*F24F 5/00* (2006.01)

(52) U.S. Cl.
CPC .......... *F24F 5/0017* (2013.01); *F24F 5/0035* (2013.01); *F24F 6/02* (2013.01); *Y02E 60/147* (2013.01)

(56) References Cited

U.S. PATENT DOCUMENTS

| | | | |
|---|---|---|---|
| 2,029,428 A | 2/1936 | Knight | |
| 2,071,509 A | 2/1937 | Dudley | |
| 2,798,570 A * | 7/1957 | Kelley | F24F 3/1417 159/4.1 |
| 2,935,154 A * | 5/1960 | Kelley | F24F 3/1417 261/131 |
| 4,926,656 A | 5/1990 | Hickley et al. | |
| 6,370,900 B1 | 4/2002 | Maeda | |
| RE39,288 E * | 9/2006 | Assaf | F24F 3/1411 62/271 |
| 2005/0109052 A1* | 5/2005 | Albers | F24F 3/1417 62/271 |
| 2006/0254294 A1 | 11/2006 | Shimamoto et al. | |
| 2010/0013112 A1* | 1/2010 | Forkosh | F24F 3/1417 261/128 |
| 2011/0073290 A1* | 3/2011 | Chang | B01D 53/263 165/133 |
| 2012/0204591 A1 | 8/2012 | Jarvis | |

\* cited by examiner

SYSTEM AND METHOD OF COOLING BY LATENT ENERGY TRANSFER

FIELD OF THE INVENTION

The present invention relates to a system and method of cooling by latent energy transfer and, in particular, to cool a fluid by discharging unwanted low temperature thermal energy to a surrounding ambient environment utilising a fluid evaporation process involving permitted or forced ventilation of air across a surface area of a heat transfer fluid. The invention further relates to an air treatment system utilising the cooled heat transfer fluid for cooling air and for supplying ventilation air to the evaporation process. A body of liquid is cooled close to the prevailing wet bulb temperature, discharging unwanted thermal energy to the surroundings, rendering the liquid suitable as a cooling medium for removing unwanted thermal energy from a location or in a process.

BACKGROUND OF THE INVENTION

A reliable method of rejecting unwanted thermal energy to ambient is frequently required, for example, as part of many industrial and manufacturing processes, and in occupied building heating, ventilation and cooling (HVAC) technologies. This requirement is present in both temperate and tropical climates. Discharge of thermal energy to the ambient environment can be achieved by passing thermal transfer fluid through a conducting and/or radiating heat exchanger surface, where the temperature of the fluid is greater than ambient dry bulb temperature.

Where the transfer fluid temperature is close to ambient dry bulb temperature, a relatively large heat exchanger surface is required to discharge the required amount of thermal energy. Where ambient temperature exceeds the temperature of the transfer fluid, no advantageous transfer of thermal energy can take place. In these circumstances, use of a heat pump (reverse Rankine cycle) is commonly used to raise the temperature of the transfer fluid well above ambient, so that transfer of unwanted thermal energy to the environment can readily take place by radiation, convection and or conduction, before cooling the fluid by expansion to a temperature suitable to provide the necessary cooling effect.

As an alternative to radiation or convection transfer through a heat exchanger, direct evaporation of a transfer fluid, commonly water, may be used to transfer energy to the ambient environment. Direct evaporation involves transferring the latent heat of evaporation of water or other fluid vapour from a body of liquid, into the ambient air, with a corresponding fall in the sensible heat energy in the remainder of the body of liquid resulting in a temperature reduction. This method is used, for example, in cooling towers, typically combined with a heat exchanger to transfer thermal energy from a transfer fluid, in the heat exchanger, to the evaporating water droplets, resulting in a fall in the temperature of the transfer fluid.

One advantage of evaporative cooling is that thermal energy transfer can continue even below the ambient dry bulb temperature, even to as low as the wet bulb temperature, which may be ten or more degrees Celsius lower than dry bulb temperature in some instances, thus increasing the temperature differential across the heat exchanger in the cooling tower. Where temperature transfer can be achieved at a higher temperature differential than available from the ambient dry bulb temperature, a smaller heat exchanger may be used, for a given thermal load. Alternatively, less energy may by consumed by a reverse Rankine cycle heat pump that is using the transfer fluid from a cooling tower as a heat sink, to achieve the required transfer of unwanted thermal energy to ambient. However, with indirect contact cooling tower technology, heat transfer across a heat exchanger always results in a temperature of the transfer fluid at least several degrees above the prevailing wet bulb temperature.

The use of a cooling tower alone is ineffective in many climates as the wet bulb temperatures do not fall low enough, for sufficiently long periods of time in summer, to produce a usefully cooled transfer fluid. Where temperature differences are small, very large surface areas and very large flow rates are required, necessitating greater energy to operate the cooling tower in the form of high exergy electrical/mechanical energy, typically supplied by fossil fuel powered electrical generators or other electrical generators.

The other commonly used technology, the reverse Rankine cycle requires even greater input of high quality electrical/mechanical energy (high exergy), to remove low quality thermal energy (low exergy), resulting in a high degree of irreversible conversion of energy (loss of exergy) typically requiring the burning of fossil fuels or a nuclear power cycle to reliably provide electricity for the heat pump. There is a widespread desire to reduce the use of these fuels in energy cycles.

It is an object of the present invention to overcome at least some of the aforementioned problems or to provide the public with a useful alternative.

Any discussion of documents, acts, materials, devices, articles or the like, which has been included in the present specification is solely for the purpose of providing a context for the present invention. It should not be taken as an admission that any or all of the previous discussion forms part of the prior art base or was common general knowledge in the field of the invention as it existed before the priority date of any of the claims herein.

SUMMARY OF THE INVENTION

According to an aspect, the present invention provides a fluid cooling system including:

a volume of heat transfer fluid including a surface area; and a means for permitting or forcing a volume of air across the surface area of the volume of heat transfer fluid, the wet bulb temperature of the air being approximately at or less than a required temperature of the heat transfer fluid sufficient to remove thermal energy from a process or location, whereby the volume of air causes the temperature of said fluid to be lowered to or maintained at approximately said required temperature by evaporative means.

In an embodiment, the required temperature is an approximate maximum temperature of the fluid beyond which the fluid is too warm to cause a desired removal of thermal energy from the target process or location upon transfer thereto. Whilst the most effective cooling may occur when the wet bulb temperature is less than the required fluid temperature, some slight cooling effect may occur when the wet bulb temperature is approximately equal to the required temperature. The term "approximately at or less than a temperature of the heat transfer fluid" is intended to encompass each of these possible scenarios in which an effective cooling of fluid will occur.

In an embodiment, the volume of heat transfer fluid is held in a tank and the volume of air is permitted or forced across the top surface area of the body of fluid in the tank, wherein cooled fluid that is required at said process or location is transferred from said tank.

In an alternate embodiment, the volume of heat transfer fluid is in the form of droplets whereby each droplet has a droplet surface area which forms part of the surface area of the volume of heat transfer fluid across which the volume of air is permitted or forced, wherein cooled fluid that is required at said process or location is transferred from a tank which receives the cooled droplets.

Reference above to receiving cooled droplets may be direct receiving of the cooled droplets into the tank, or indirect receiving of the droplets in circumstances where, for example, the tank is a storage tank to which the cooled droplets are transferred.

In an embodiment, the cooling system includes a single tank from which cooled fluid is transferred to the process or location, and into which warmed fluid is returned from the process or location.

In an embodiment, said volume of heat transfer fluid is sufficiently large such that the temperature of said fluid is not increased by the addition of return fluid from the process or location to an extent which renders the fluid no longer useful in removing thermal energy from a process or location.

In an embodiment, return fluid is received in an upper portion of the tank and cooled fluid is transferred from a lower portion of the tank to the location or process.

In an alternate embodiment, the cooling system includes two tanks, a first tank being the tank from which fluid which has been cooled approximately down to or below the required temperature is transferred to the process or location, and a second tank to which warm return fluid from the location or process is transferred.

In an embodiment, the warmer fluid is held in the second tank and prevented for a time period from transferring to and mixing with fluid in the first tank so as to maintain fluid in the first tank at or near said required temperature.

In an embodiment, fluid in the second tank is transferred to the first tank when fluid in the second tank is approximately at or near said required temperature.

In an embodiment, warmed fluid returning from the process or location is received in an upper portion of the second tank and cooled fluid is transferred from a lower portion of the second tank to an upper portion of the first tank.

In an embodiment, the second tank includes a means for permitting or forcing a volume of air across the surface area of the heat transfer fluid in the second tank, the wet bulb temperature of the air being approximately at or less than a temperature of the heat transfer fluid in the second tank to cause the temperature of the heat transfer fluid in the second tank to be lowered by evaporative means.

In an embodiment, the system further includes a third, overflow tank to retain overflow of any warm fluid from the second tank until conditions allow evaporative cooling of fluid in the second tank.

In an embodiment, when fluid from the second tank is transferred to the first tank, fluid from the third tank is transferred to the second tank.

In an embodiment, when the temperature of fluid in the third tank is comparable to the required temperature it is used as a source of makeup fluid for the first tank.

In an embodiment, the temperature of fluid in the third tank is lowered by permitting or forcing a volume of air across the surface area of fluid in the third tank, the wet bulb temperature of the air being approximately at or less than a temperature of the heat transfer fluid in the third tank.

In an embodiment, the system further includes:
a means of reducing a wet bulb temperature of ambient air to produce air which has a wet bulb temperature approximately at or less than the required temperature.

In an embodiment, the means of reducing the wet bulb temperature of ambient air is a dehumidification process that reduces absolute humidity of the ambient air.

In an embodiment, said dehumidification process forms part of an air treatment system for treating air prior to entry into a space, wherein the air treatment system further includes a cooling process upstream or downstream of the dehumidification process.

In an embodiment, heat transfer fluid lowered to or maintained at approximately said required temperature is transferred to the cooling process for removing thermal energy.

In an embodiment, the volume of air that is permitted or forced across a surface area of the volume of heat transfer fluid is air sourced from said space which has a sufficiently low wet bulb temperature to cause the temperature of the heat transfer fluid to be lowered or maintained at approximately said required temperature by evaporative means.

In an embodiment, the space is a partially enclosed area such as a home or building interior, or an interior of a sports stadium or animal barn. In an embodiment, the space is cooled by pumping cooled fluid through a heat exchanger in the space. In an embodiment, the heat exchanger is a large, slowly flowing heat exchanger such as a hydronic cooling pipe network in a floor, walls or ceiling of each level of a building.

In an embodiment, the means for forcing the volume of air across the surface area of the volume of heat transfer fluid is in the form of one or more ventilation fans inducing air to move at a controlled velocity. The velocity can be controlled by adjusting the fan speed, or in the case of fluid held in a tank adjusting the enclosed volume above the free surface. By determining the free surface height, the cooling rate of each tank can be optimised while allowing the fan to operate at an optimum efficiency. The rate of evaporation is dependent on the air velocity above the free surface and this can be calculated by those skilled in the art.

In an embodiment, the tank has a volume sufficient to supply cooling water as required to the process or location for a duration equal to a longest expected period in which evaporative cooling will be ineffective due to elevated wet bulb temperatures.

In an embodiment, said heat transfer fluid is water. The cost of water is extremely low compared to the cost of other cooling liquids, and is freely available on the surface of the Earth. It is entirely non-toxic, and has a very favourable specific heat storage capacity.

According to another aspect, the present invention provides an air treatment system for treating a volume of air prior to entering a space, said air treatment system including:
a dehumidifier for reducing absolute humidity of ambient air to produce dried air;
a heat exchanger downstream of the dehumidifier including an input of cooled process fluid for cooling the dried air by removing thermal energy by evaporation;
a means of permitting or forcing ambient air into the dehumidifier, dried air from the dehumidifier across the heat exchanger, and dried and cooled air from the heat exchanger into the space; and
wherein the cooled process fluid is produced by permitting or forcing a volume of air across a surface area of a volume of heat transfer fluid, the wet bulb temperature of the air being approximately at or less than a temperature of the heat transfer fluid required to remove thermal energy from the dried air, whereby the volume of air causes the temperature of said fluid to be lowered to or maintained at approximately said required temperature by evaporative means.

In an embodiment, the volume of air that is permitted or forced across a surface area of the volume of heat transfer fluid is air sourced from said space which has a sufficiently low wet bulb temperature to cause the temperature of the heat transfer fluid to be lowered or maintained at approximately said required temperature by evaporative means.

According to another aspect, the present invention provides a method or process for cooling fluid including:

permitting or forcing a volume of air across a surface area of a volume of heat transfer fluid, the wet bulb temperature of the volume of air being approximately at or less than a required temperature of heat transfer fluid sufficient to remove thermal energy from a process or location, the air causing the temperature of said fluid to be lowered to or maintained at approximately said required temperature by evaporative means.

In an embodiment, the method or process further includes reducing a wet bulb temperature of a volume of air prior to the air being permitted or forced across the surface area of the volume of the heat transfer fluid, thereby reducing an absolute humidity of the air without substantially altering a dry bulb temperature of the air.

According to yet another aspect, the present invention provides a method or process for treating air prior to entry into a space, said method or process including:

reducing absolute humidity of ambient air to produce dried air;

permitting or forcing said dried air across a heat exchanger to produce cooled air, the heat exchanger having an input of cooled fluid for cooling the dried air by removing thermal energy by evaporation;

permitting or forcing said dried and cooled air into the space; and wherein the cooled fluid is produced by permitting or forcing a volume of air across a surface area of a volume of heat transfer fluid, the wet bulb temperature of the air being approximately at or less than a temperature of the heat transfer fluid required to remove thermal energy from the dried air, whereby the volume of air causes the temperature of said fluid to be lowered to or maintained at approximately said required temperature by evaporative means.

In an embodiment, the volume of air that is permitted or forced across a surface area of the volume of heat transfer fluid is air sourced from said space which has a sufficiently low wet bulb temperature to cause the temperature of the heat transfer fluid to be lowered or maintained at approximately said required temperature by evaporative means.

BRIEF DESCRIPTION OF THE FIGURES

The accompanying drawings, which are incorporated in and constitute a part of this specification, illustrate several implementations of the invention and, together with the description, serve to explain the advantages and principles of the invention. In the drawings.

DETAILED DESCRIPTION OF EMBODIMENT(S) OF THE INVENTION

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the embodiments and the following description to refer to the same and like parts.

It is to be understood that a cooling system and method embodying the present invention may be used in a number of different applications requiring cooled fluid or air to be provided to a location or a process. By way of example, the cooling of fluid for subsequent use in a process used to cool a space in a building interior is described herein. However, the present invention has other applications, including cooling other interiors or internal (fully or partially enclosed) areas or other processes including industrial processes.

According to one aspect, the present invention relates to a fluid cooling system 10 which includes a means of permitting or forcing a volume of air across the surface area of a volume of heat transfer fluid, the wet bulb temperature of the air being approximately at or less than a temperature of the heat transfer fluid required to remove thermal energy from a process or location (referred to herein at times as "the required temperature"), whereby the volume of air causes the temperature of the fluid to be lowered to or maintained at approximately the required temperature by evaporative means. As an example, at least one tank 12 may be used for holding a body or reservoir of heat transfer fluid 14, such as water, which may be transferred to a location or process 16 for the purpose of providing cooling or removal of thermal energy when the fluid is approximately at or less than a required temperature. The required temperature may, for example, be a maximum fluid temperature beyond which the fluid would be too warm to have an appropriate cooling effect in the location or process.

Where cooling is required in an interior of a building, for example, the building interior may be cooled by pumping cooled fluid from the first tank 12 through a heat exchanger (not shown) in the building which is in contact with air and/or conducting structures in the building interior. In other words, the cooled fluid may be provided to the heat exchange process used to cool the building interior. The heat exchanger may, for example, be a large, slowly flowing heat exchanger such as a hydronic cooling pipe network (not shown) in the floor, walls or ceiling of each level of the building.

The skilled addressee would appreciate that when a body of conditioned, slightly cooled water is available to remove unwanted thermal energy from a building, any appropriate heat exchange system may be designed such that unwanted thermal energy can be readily and completely removed from the building using fluid at temperatures as high as 20° C. on entry and 22.5° C. on exit from the building, if the desired temperature in the building is 23° C., for example.

Figure 1:
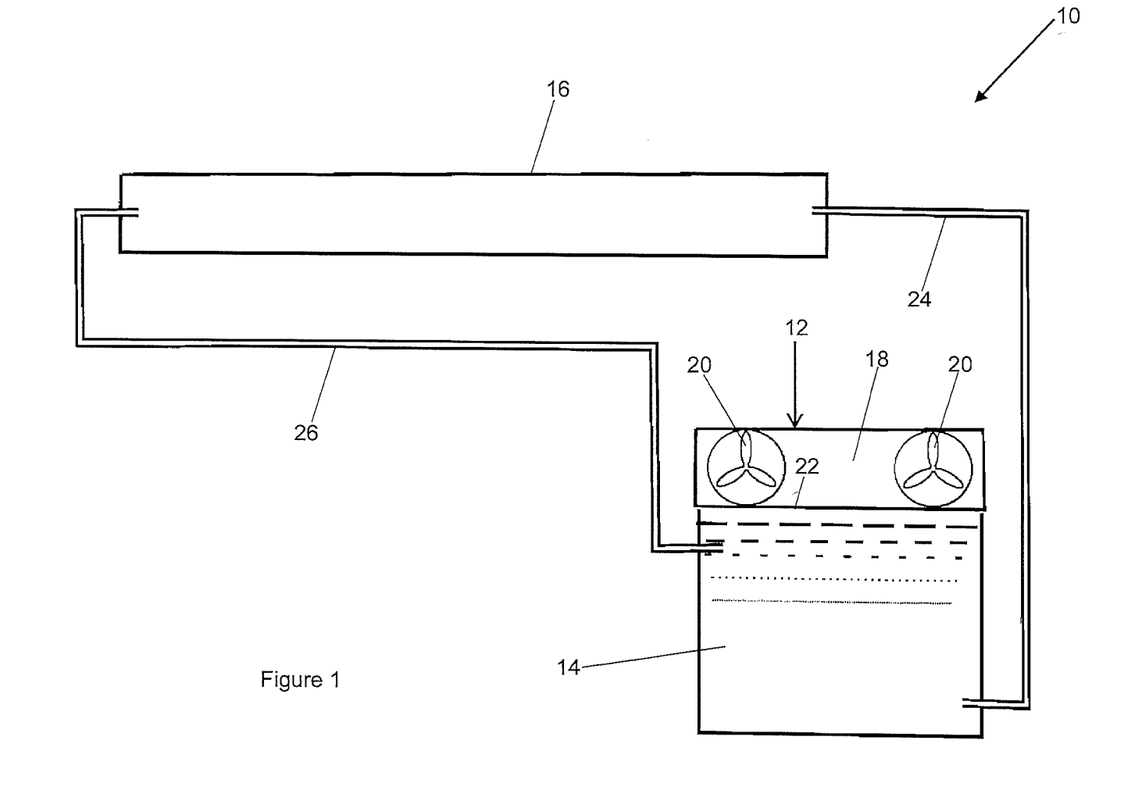
FIG. 1 is a schematic view of a single-tank fluid cooling system according to an embodiment.

A fluid cooling system 10 according to an embodiment utilising the previously mentioned tank 12 is shown in FIG. 1. The headspace 18 in the tank may include a fan 20 or other means of permitting or forcing ventilation of air, which may be ambient atmosphere, across a surface 22 of the body of fluid when a wet bulb temperature of the ambient atmosphere is less than the temperature required to remove thermal energy from a process or location. It was found, during testing, that for a velocity of air forced or permitted across the surface of a body of water of 0.6 m/s to 1 m/s, the temperature of the water was maintained between 18 and 19 degrees Celsius, achieving cooling rates of up to 100 Watts/$m^2$ of water surface area. This test was conducted at an ambient dry bulb temperature of 26 to 27 degrees Celsius. The system 10 may further include pipework 24 and 26 or other means for enabling the respective transfer of cooled fluid from the tank 12 to the process or location 16, as required, and warmed fluid from the process or location 16 back to the tank 12.

Figure 2:
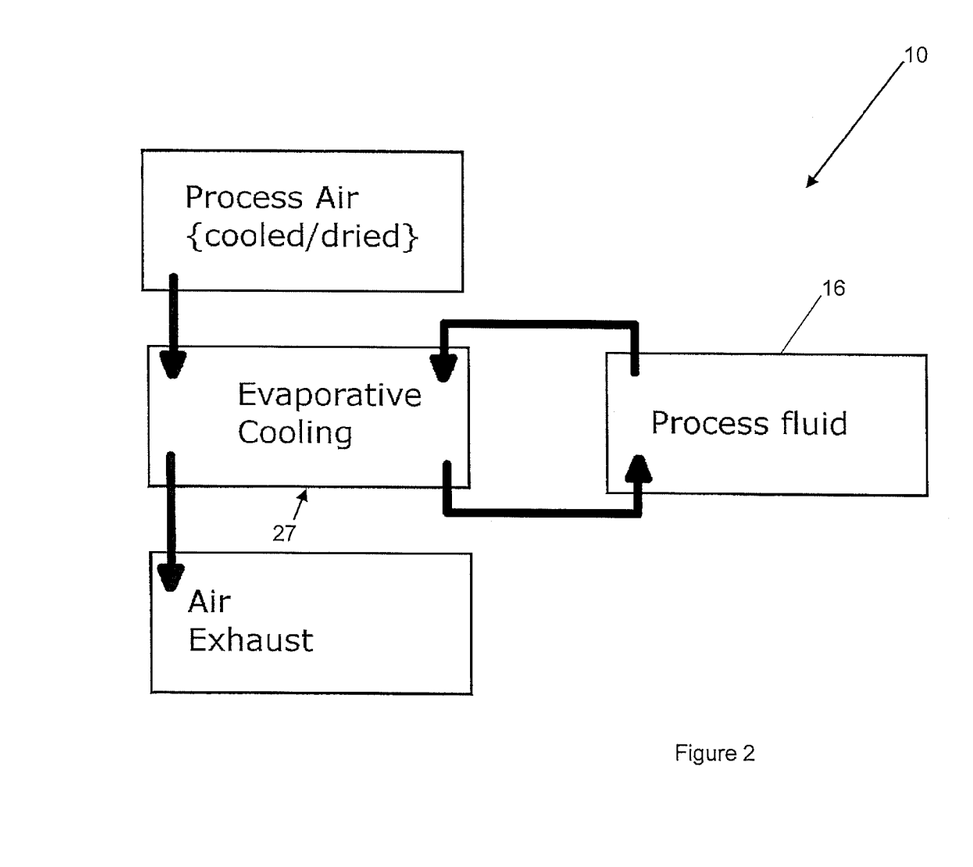
FIG. 2 is a flow diagram of a single-tank fluid cooling system utilising a water tower according to an embodiment.

In another embodiment, the tank 12 may be replaced by a combined water tower and tank 27 wherein heat transfer fluid is sprayed (not shown) and a stream of air is forced across the surface area of droplets of heat transfer fluid to thereby cool the droplets, resulting in a body or reservoir of cooled fluid collected in the water tower and tank 27. The skilled person would appreciate that the same evaporative cooling principles apply regardless of whether the volume of heat transfer fluid is a body of water in a tank, or a spray of droplets in a water tower. A system 10 incorporating a combined water tower and tank 27 is shown in the flow diagram of FIG. 2, and this Figure also shows that the air may be processed (cooled and dried) prior to entry into the combined water tower and tank 27, as described in more detail below with respect to the embodiment of FIG. 6.

Providing a volume of air with a wet-bulb temperature that is approximately at or less than a temperature of heat transfer fluid that is required to remove thermal energy from a location or process, can be achieved in a number of ways. For example, in the example above in which air is forced across a body of heat transfer fluid, the air may be ambient air and during certain periods of a diurnal cycle may naturally have a sufficiently low wet-bulb temperature to permit useful cooling. If processing of the air is required to achieve the sufficiently low wet-bulb temperature, a volume of ambient air may undergo a dehumidification process that also reduces absolute humidity of the ambient air without substantially altering a dry bulb temperature of the ambient air. For example, drying ambient air using desiccant technology may achieve this result, however, the present invention is not limited to any one means by which the incoming volume of air achieves the requisite wet-bulb temperature. A system and method of dehumidifying air using desiccant technology is described in a co-pending application by the present Applicant.

Figure 3:
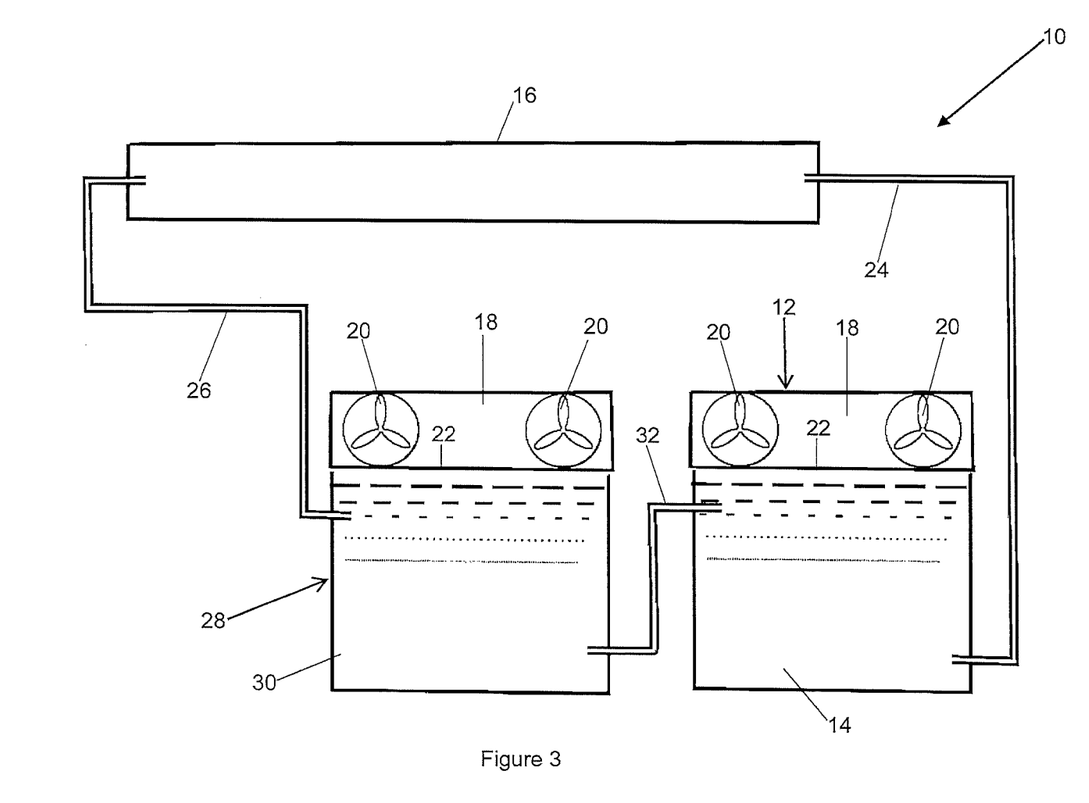
FIG. 3 is a schematic view of a double-tank fluid cooling system according to an embodiment.

The system 10 according to either of the above embodiments may include a second tank 28 in series with the first tank 12/27, as shown in FIG. 3. In this embodiment, return fluid 30 at a fluid temperature that is higher than the required fluid temperature may be returned from the location or process 16 to the second tank 28. The second tank 28 may be configured similarly to tank 12 and include a fan 20 or other means for permitting or forcing ventilation of ambient atmosphere across a surface 22 of the body of fluid in the second tank when a wet bulb temperature of the ambient atmosphere is less than the required fluid temperature. The fluid in the first and second tanks may communicate via additional pipework 32.

The warmed fluid 30 may be held in the second tank 28 and prevented for a time from being transferred to and mixed with heat transfer fluid 14 in the first tank 12 so as to maintain fluid in the first tank at or near the first fluid temperature. When a temperature of fluid in the second tank is reduced to or close to the required fluid temperature through use of the one or more fans 20 in the second tank 28, fluid may be transferred from the second tank to the first tank 12.

Figure 4:
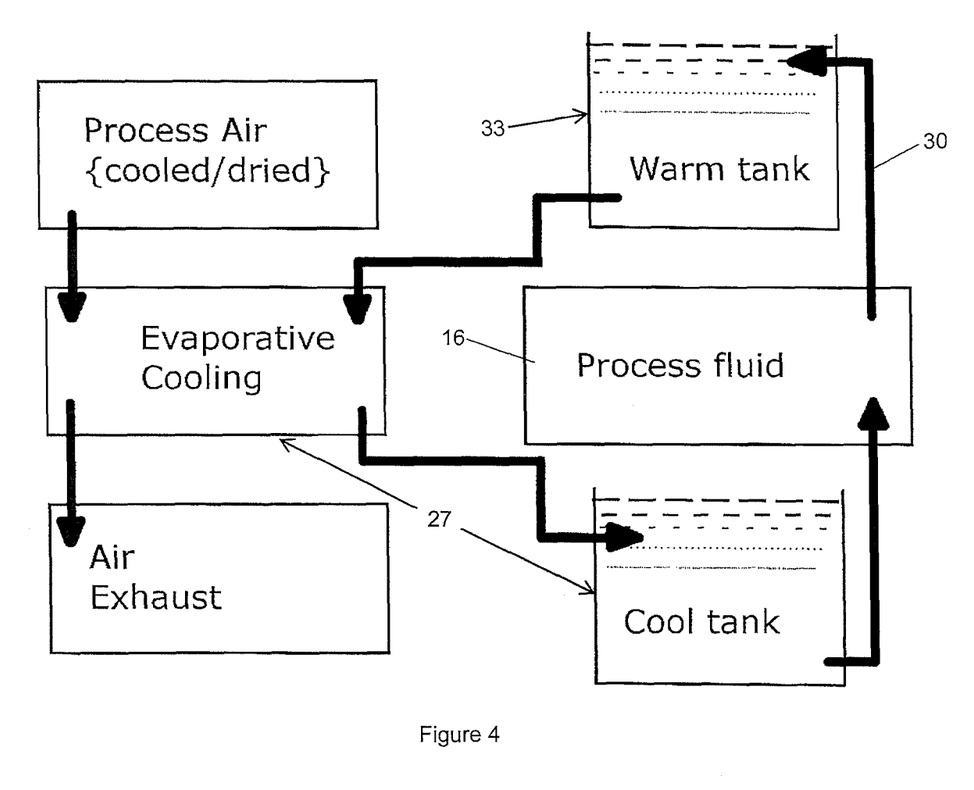
FIG. 4 is a flow diagram of a double-tank fluid cooling system utilising a water tower according to an embodiment.

FIG. 4 illustrates a flow diagram of a two-tank system when the first tank is the combined water tower and tank 27 described earlier with respect to FIG. 2. Return fluid 30 at a fluid temperature that is higher than the required fluid temperature may be returned from the location or process 16 to a second tank, which although may be configured identically to second tank 28 has been allotted a new reference numeral 33 for the purpose of distinguishing this second tank, which is associated with a first tank 27 being a combined water tower and tank, from the second tank 28 which was associated with first tank 12 configured to hold a body of water. The second tank 33 may be configured similarly to tank 12 and include a fan 20 or other means for permitting or forcing ventilation of ambient atmosphere across a surface 22 of a body of fluid in the second tank 33 when a wet bulb temperature of the ambient atmosphere is less than the required fluid temperature. Alternatively, the second tank 33 may be a second water tower and tank combination similar to tank 27, or may be a temporary storage tank without any associated fluid cooling means.

Figure 5:
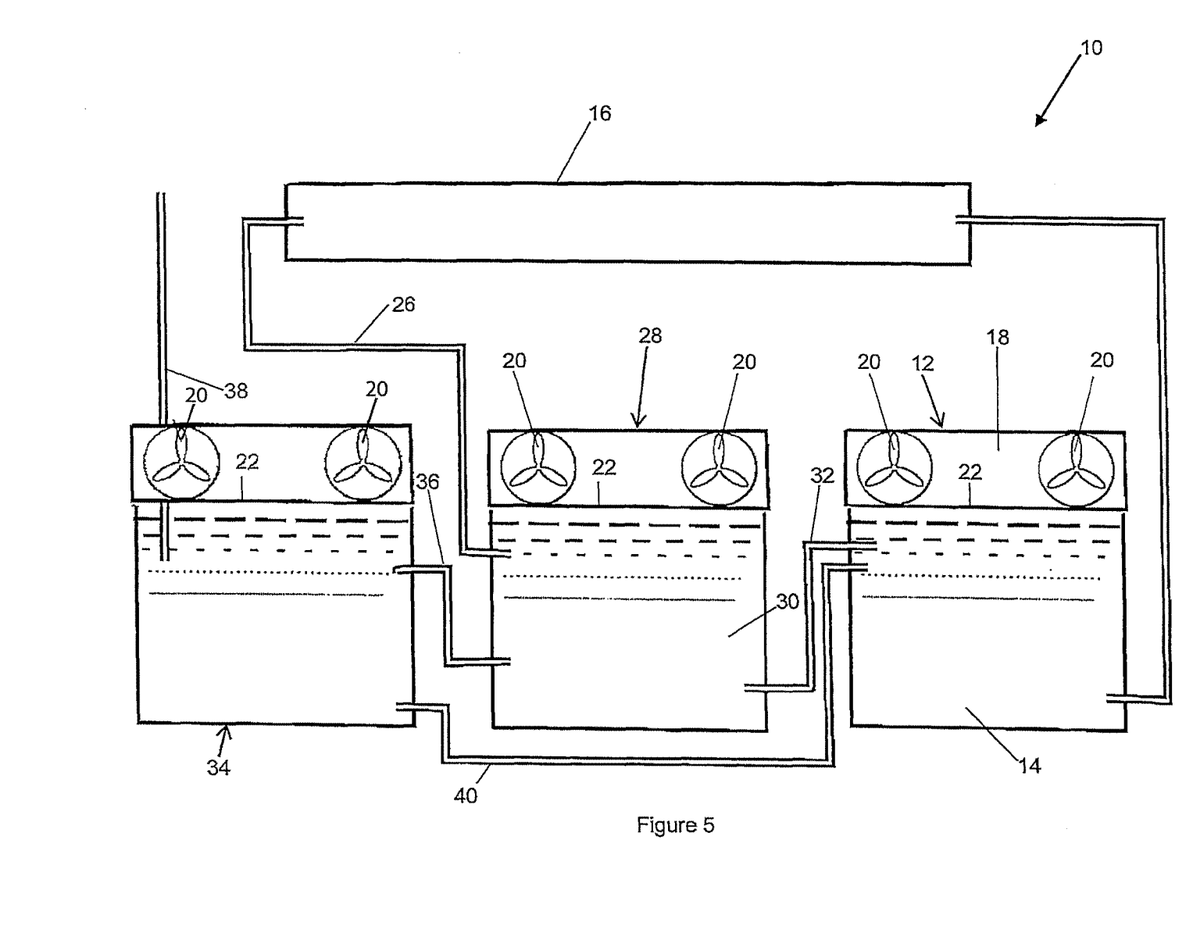
FIG. 5 is a schematic view of a double-tank fluid cooling system incorporating a storage tank according to an embodiment.

The double-tank systems described above may further include a third tank 34, as shown in FIG. 5. The purpose of the third tank may be to retain overflow of any warm fluid 30 from the second tank 28/33 until ambient conditions allow evaporative cooling of fluid in the second tank 28/33 to the required fluid temperature. Transfer of fluid between the second and third tanks is via pipework 36, and fluid in the third tank may also be vented to atmosphere via pipework 38. When the temperature of fluid in the third tank 36 is comparable to the required fluid temperature it may also be used as a source of makeup fluid for the first tank 12/27 to make up water mass removed from the system through the evaporation process. Transfer of fluid between the third and first tanks is via pipework 40.

The pipework may be arranged such that when warm water from any one tank is utilised, it exits from an upper portion of the tank where there are warmer layers of water, and when cooled water is utilised, it exits from a lower portion of the tank where there are cooler layers of water. Where required, each tank may include a fluid temperature sensor, an ambient air temperature sensor, and a control mechanism for controlling the flow of fluid to and from the tank (and hence the volume in each tank). Such a control mechanism may also be used for controlling the fans and fan speed. The sensors and control mechanisms may further be configured such that a reading from a sensor triggers operation of the control mechanism(s). For example, a sensor may sense when the wet bulb temperature of the air is below the required fluid temperature, and the control mechanism may operate the fans accordingly. The skilled addressee would also appreciate that making factors such as air velocity over the surface of fluid and fluid volume inside the tank (and hence volume of headspace above) adjustable, allows for flexibility in the various tank configurations to suit different applications and environments.

Accordingly, the combination of higher temperature and return fluid retention in the second tank 28/33 results in a sufficient proportion of the unwanted thermal energy being rejected from the fluid, before it is returned to the first tank 12/27, or a third holding tank 34, at sufficiently low temperature such that the temperature of fluid in the first tank 12/27 is not undesirably increased. With the higher temperature of fluid in the second tank 28/33, useful cooling can be achieved for more continuous hours during summer time, so that unwanted thermal energy can be rejected more effectively allowing the use of smaller total volume of tanks than would otherwise be required. It is estimated that the addition of a second tank 28/33 can reduce the total required tank volume by up to 20 times.

As the temperature of fluid in the second tank 28/33 is reduced by forced evaporation (or other means) until it is close to the required fluid temperature, and when necessary, the return water is retained in a third tank 34 until it is comparable to the required fluid temperature, the temperature of fluid in the first tank 12/27 may remain sufficiently low to provide useful cooling at all times. The temperature of fluid in the first tank 12/27 can thus be maintained usefully lower than if the water were returned immediately from the source of heating, increasing the utility and availability of cooling water or substantially reducing the size of the tank required to maintain cooling capacity during extended periods of summer.

Figure 6:
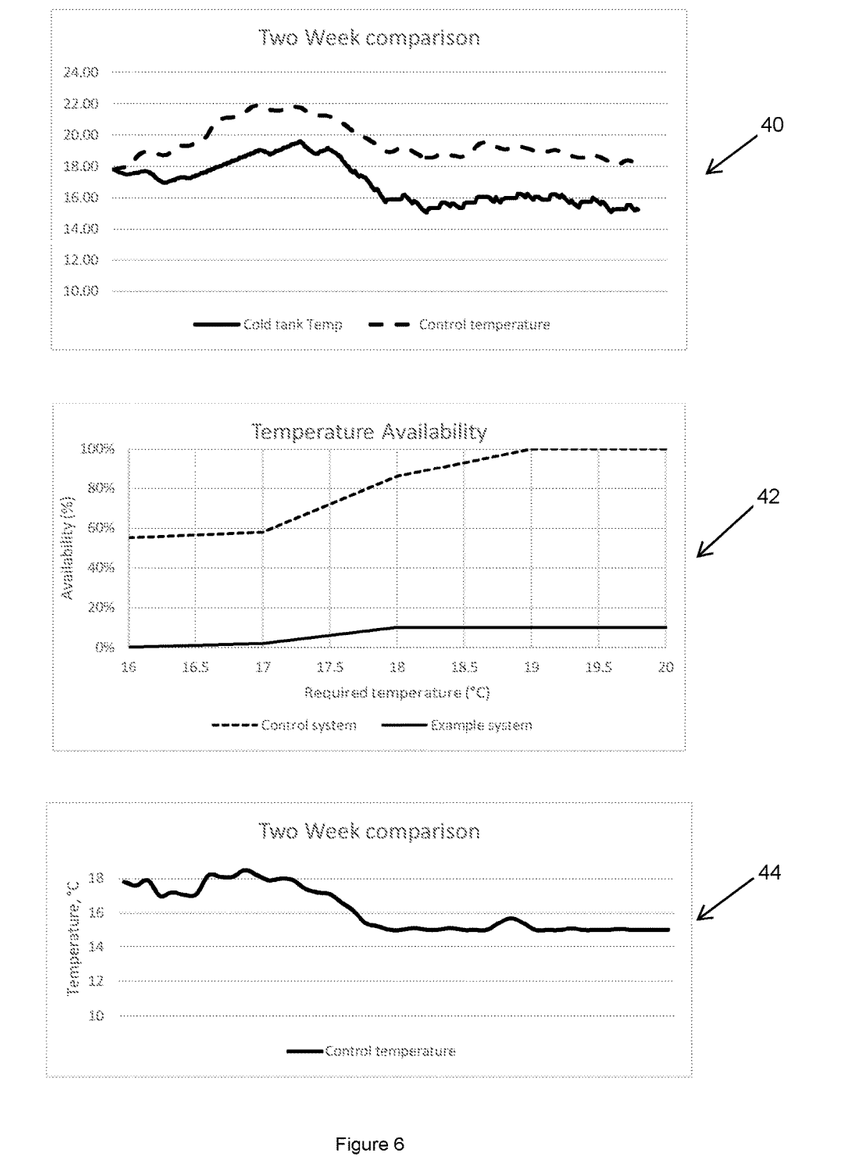
FIG. 6 illustrates three graphs reflecting results of modelling single and multi-tank cooling systems according to embodiments of the present invention.

FIG. 6 shows three graphs resulting from a mathematical modelling of the system 10 when using a first tank 12 on its own as compared with using a combination of a first tank 12 and a second tank 28. The upper graph 40 shows the hourly calculated temperature of fluid in the first tank of a system 10 including two tanks in series, compared to a single tank system of identical total volume and area. Despite each starting at the same temperature (17.8° C.), the single tank system is above 18° C. for much of a two week period, while the double-tank system approaches 15° C. on several occasions. The data is for a two week, hot summer period for Adelaide (South Australia) in the first week of January in a test weather year. It is expected that if tanks 12 and 28 were replaced with tanks 27 and 33 and testing was performed under similar conditions, the resulting data would be comparable.

The second graph 42 shows the percentage of the time that the example double-tank system can supply cooling water below a desired temperature. The third graph 44 demonstrates the above mentioned example of a single tank system requiring twenty times the volume of a multi-tank tank system. Cooling is not utilised when the tank is below 15° C. in any example.

Figure 7:
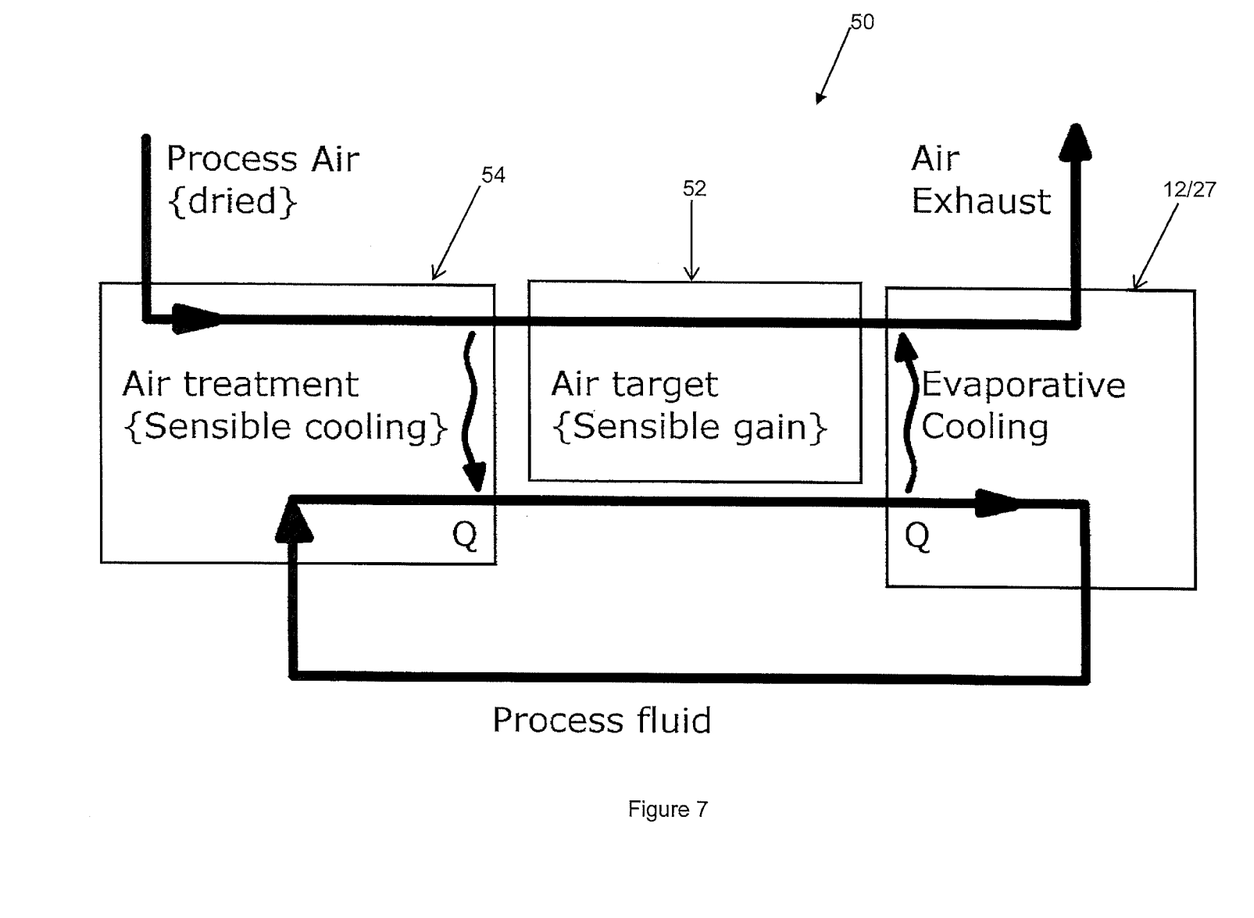
FIG. 7 is a flow diagram of an air treatment system for a space, including a dehumidification and cooling means for providing dried and cooled air to the space, and a single-tank fluid cooling means utilising a water tower for supplying cooled fluid to the cooling means and which may source air from the space.

According to another aspect, the present invention provides an air treatment system 50 utilising the cooled process fluid to remove thermal energy from a volume of air, thereby cooling the air prior to entry into a space 52 or process. FIG. 7 shows an example system 50 which can be considered to have two distinct yet interacting streams, those being air and water. The volume of air may first be pre-treated in a dehumidification process (not shown) wherein a portion of the entrained water vapour or latent heat is removed without Significant change to the sensible heat of the air stream. The system 50 also shows a cooling process 54 for reducing the sensible heat of the air stream by a method of heat exchange with cooled fluid produced by means described earlier in this specification. In this regard, tank 12/27 is also shown in FIG. 7 where it can be appreciated that cooled fluid produced in tank 12/27 is transferred to the cooling process 54. Thus, fluid is warmed through the cooling process 54 and is subsequently cooled in tank 12/27 before being returned back to the cooling process 54 in a closed loop. The dehumidified and cooled air can be passed to the space (which may equally be another location or process), the exhaust of which may be fed to the tank 12/27. Accordingly, after gaining sensible heat from the air stream in the cooling process 42, the fluid is passed to the tank 12/27 which is an evaporative cooling means where the largely reduced wet bulb temperature from the cooled and dried air stream improves the amount of cooling available in the fluid stream through the removal of latent heat.

The fluid cooling system 10 embodying this aspect of the present invention thus allows effective cooling of a building, for example, with a coefficient of performance of available useful thermal cooling energy to input electrical energy supply (and to the control system including fans for forced ventilation) of greater than 20. When compared to a COP of electrically driven reverse Rankine cycle heat pumps which are typically between 3.6 and 4, and at the very highest, less than 5, the benefits of the present invention are clear. As the cost of electricity increases and the desirability of reduced use of fossil fuel or nuclear powered electrical generation increases, the advantages of this system are obvious.

Rainwater collected from the roof top of a building, except in the most arid climates, is usually sufficient to supply make up water for cooling by evaporation over the annual cycle, reducing or eliminating the requirement to supply valuable potable water from other sources. The system is therefore environmentally friendly, self-contained, and able to be mechanically powered (for fans and pumps) by non-grid energy sources such as PV panels or other renewable energy generating systems in a commercially viable manner. Over the life of the building a very substantial reduction in energy utilisation may be achieved representing a very substantial commercial benefit.

The above described cooling system and method can be combined with a solar thermal heating system, since the heat transfer surfaces in a building are relatively large and therefore the low temperature heat typically available from solar thermal collectors is able to be usefully and valuably utilised in winter heating of the building.

The capital cost of each water-holding tank 12/27, or each combined water tower and tank 28/33, can be substantially less than the installed cost of an equivalent reverse Rankine cycle heat pump system and associated heat exchangers. The liquid used for cooling by evaporation may also be used as the store of sensible cooling energy, eliminating the cost of a heat exchanger as well as eliminating the temperature differential that a heat exchanger necessarily entails, thereby improving the utility as well as reducing the cost of the total system.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The claims defining the invention are as follows:

1. A fluid cooling system comprising:
   a volume of heat transfer fluid held in a first tank; wherein the volume of heat transfer fluid in the first tank has a surface area;
   a means for permitting or forcing a volume of air across the surface area of the volume of heat transfer fluid while in the first tank, a wet bulb temperature of the air being approximately at or less than a required temperature of the heat transfer fluid sufficient to remove thermal energy from a process or a location, whereby the volume of air causes the temperature of said heat transfer fluid in the first tank to be lowered to or maintained at approximately the required temperature by evaporative means and become cooled fluid;
   wherein cooled fluid that is required at said process or said location is transferred from the first tank to the process or the location; and the cooled fluid is used to cool the process or the location by absorbing heat from the process or the location and becoming warm return fluid;
   wherein the cooling system includes a second tank to which warm return fluid from the process or the location is transferred.

2. The fluid cooling system according to claim 1, wherein the volume of heat transfer fluid is in the form of droplets and each droplet has a droplet surface area which forms part of the surface area of the volume of heat transfer fluid across which the volume of air is permitted or forced, wherein cooled fluid that is required at said process or said location is transferred from the first tank which receives the cooled droplets.

3. The fluid cooling system according to claim 1, wherein the warm return fluid is held in the second tank and prevented for a time period from transferring to and mixing with the heat transfer fluid in the first tank so as to maintain the heat transfer fluid in the first tank at or near said required temperature.

4. The fluid cooling system according to claim 3, wherein the warm return fluid in the second tank is transferred to the first tank when the warm return fluid in the second tank is approximately at or near the required temperature.

5. The fluid cooling system according to claim 4, wherein warmed fluid returning from the process or the location is received in an upper portion of the second tank and cooled fluid is transferred from a lower portion of the second tank to an upper portion of the first tank.

6. The fluid cooling system according to claim 4, wherein the second tank includes a means for permitting or forcing a volume of air across the surface area of the warm return fluid in the second tank, the wet bulb temperature of the air being approximately at or less than a temperature of the warm return fluid in the second tank to cause the temperature of warm return fluid in the second tank to be lowered by evaporative means.

7. The fluid cooling system according to claim 6, further comprising a third overflow tank to retain overflow of warm return fluid from the second tank until conditions allow evaporative cooling of warm return fluid in the second tank.

8. The fluid cooling system according to claim 7, wherein when warm return fluid from the second tank is transferred to the first tank, fluid from the third tank is transferred to the second tank.

9. The fluid cooling system according to claim 8, wherein when a temperature of fluid in the third tank is comparable to the required temperature the fluid in the third tank is used as a source of makeup fluid for the first tank.

10. The fluid cooling system according to claim 9, wherein the temperature of fluid in the third tank is lowered by permitting or forcing a volume of air across a surface area of fluid in the third tank, a wet bulb temperature of the air being approximately at or less than a temperature of the fluid in the third tank.

11. The fluid cooling system according to claim 1, further including:
    a means of reducing a wet bulb temperature of ambient air to produce air which has a wet bulb temperature approximately at or less than the required temperature.

12. The fluid cooling system according to claim 11, wherein the means of reducing the wet bulb temperature of ambient air is a dehumidification process that reduces absolute humidity of the ambient air.

13. The fluid cooling system according to claim 12, wherein said dehumidification process forms part of an air treatment system for treating air prior to entry into a space, wherein the air treatment system further includes a cooling process upstream or downstream of the dehumidification process.

14. The fluid cooling system according to claim 13, wherein heat transfer fluid lowered to or maintained at approximately said required temperature is transferred to the cooling process for removing thermal energy.

15. The fluid cooling system according to claim 13, wherein the volume of air that is permitted or forced across the surface area of the volume of heat transfer fluid is air sourced from the space which has a sufficiently low wet bulb temperature to cause the temperature of the heat transfer fluid to be lowered or maintained at approximately said required temperature by evaporative means.

16. The fluid cooling system according to claim 13, wherein the space is a partially enclosed area such as a home or building interior, or an interior of a sports stadium or animal barn.

17. The fluid cooling system according to claim 1, wherein the means for forcing the volume of air across the surface area of the volume of heat transfer fluid is in the form of one or more ventilation fans inducing air to move at a controlled velocity.

18. The fluid cooling system according to claim 1, wherein the heat transfer fluid is water; and wherein the first tank has a volume sufficient to supply cooling water as required to the process or the location for a duration equal to a longest expected period in which evaporative cooling will be ineffective due to elevated wet bulb temperatures.

* * * * *